United States Patent
Danilovas

(10) Patent No.: US 10,597,315 B2
(45) Date of Patent: Mar. 24, 2020

(54) METHOD OF DISINFECTION OF DRINKING WATER USING OZONE AND SILVER CATIONS

(71) Applicant: KAUNO TECHNOLOGIJOS UNIVERSITETAS, Kaunas (LT)

(72) Inventor: Paulius Pavelas Danilovas, Kaunas (LT)

(73) Assignee: KAUNAS UNIVERSITY OF TECHNOLOGY, Kaunas (LT)

( * ) Notice: Subject to any disclaimer, the term of this patent is extended or adjusted under 35 U.S.C. 154(b) by 0 days.

(21) Appl. No.: 15/766,001

(22) PCT Filed: Sep. 27, 2016

(86) PCT No.: PCT/IB2016/055767
§ 371 (c)(1),
(2) Date: Apr. 4, 2018

(87) PCT Pub. No.: WO2017/060794
PCT Pub. Date: Apr. 13, 2017

(65) Prior Publication Data
US 2018/0282184 A1    Oct. 4, 2018

(30) Foreign Application Priority Data
Oct. 7, 2015  (LT) ..................... 2015 087

(51) Int. Cl.
*C02F 1/50* (2006.01)
*C02F 1/78* (2006.01)

(52) U.S. Cl.
CPC ............... *C02F 1/505* (2013.01); *C02F 1/78* (2013.01); *C02F 2209/23* (2013.01); *C02F 2303/04* (2013.01)

(58) Field of Classification Search
CPC ........ C02F 1/505; C02F 1/78; C02F 2209/23; C02F 2303/04
See application file for complete search history.

(56) References Cited

U.S. PATENT DOCUMENTS 4,915,955 A * 4/1990 Gomori ................... C02F 1/505
                                                    424/616
5,772,896 A   6/1998 Denkewicz
(Continued)

FOREIGN PATENT DOCUMENTS

CA    2256133 A1   6/1999
CN    101481169 A  7/2009
(Continued)

OTHER PUBLICATIONS

Machine translation of RU 2182125C1 (2002) (obtained from google patents Apr. 2019) (Year: 2002).*
(Continued)

*Primary Examiner* — Lucas A Stelling
(74) *Attorney, Agent, or Firm* — Hershkovitz & Associates, PLLC; Abe Hershkovitz

(57) ABSTRACT

Microbiologically safe and healthy drinking water is prepared from raw water by clarifying and disinfecting it with reactive oxygen derivatives and silver ions. Initially, the water is treated with ozone until a suitable concentration of 0.1-0.5 mg/l of ozone in the water is reached, after that the required amount of silver cations disinfectant solution is supplied into the water so that the silver concentration is 0.02-0.1 mg/l. A stable and safe silver disinfectant solution is used without the use of electrolysis equipment. The solution is stabilized with alkaline earth and/or alkali metal cations, which positively complement the overall intake of minerals. By using such a method, the water stored in the (Continued)

open is protected from secondary microbial contamination for a long time, particularly, longer than 3 months.

10 Claims, 1 Drawing Sheet

(56) References Cited

U.S. PATENT DOCUMENTS

| | | | |
|---|---|---|---|
| 5,935,609 A | 8/1999 | Denkewicz | |
| 2011/0139632 A1 | 6/2011 | Beringer | |

FOREIGN PATENT DOCUMENTS

| | | |
|---|---|---|
| RU | 2 182 124 C1 | 5/2002 |
| RU | 2 182 125 C1 | 5/2002 |

OTHER PUBLICATIONS

"Chemistry of Silver". Chemistry LibreTexts from chem.libretexts.org (Aug. 2015) (Year: 2015).*

English language Abstract of CN 101481169 A (Jul. 15, 2009).
English language Abstract of RU 2 182 124 C1 (May 10, 2002).
English language Abstract of RU 2 182 125 C1 (May 10, 2002).
A. Sakalauskas, V. Šulga, J. Jankauskas. "Water Supply: Water Treatment: Educational Book." Vilnius Gediminas Technical University. Vilnius: Technika, 2007, pp. 286-288. UDK: 628.16 (075.8). ISBN 9789955281122.
P. Deepen et al. "Antimicrobial, Mechanical and Thermal Studies of Silver Particle-Loaded Polyurethane." Journal of Functional Biomaterials, vol. 4, 2013, pp. 358-375.
A. P. R. Magalhaes et al. "Nanosilver Application in Dental Cements." ISRN Nanotechnology, vol. 2012, 2012, pp. 1-6. DOI:10.5402/2012/365438.
J. P. Guggenbichler et al. "A new technology of microdispersed silver in polyurethane induces antimicrobial activity in central venous catheters." Infection 27, Suppl. 1, 1999, pp. S16-S23.
World Health Organization. "Guidelines for drinking-water quality" [electronic resource]: incorporating 1st and 2nd addenda, vol. 1, Recommendations.—3rd ed. Geneva, 2008, p. 434. ISBN 978 92 4 154761 1.
International Search Report in International Application No. PCT/IB2016/055767, dated Jan. 4, 2017.

* cited by examiner

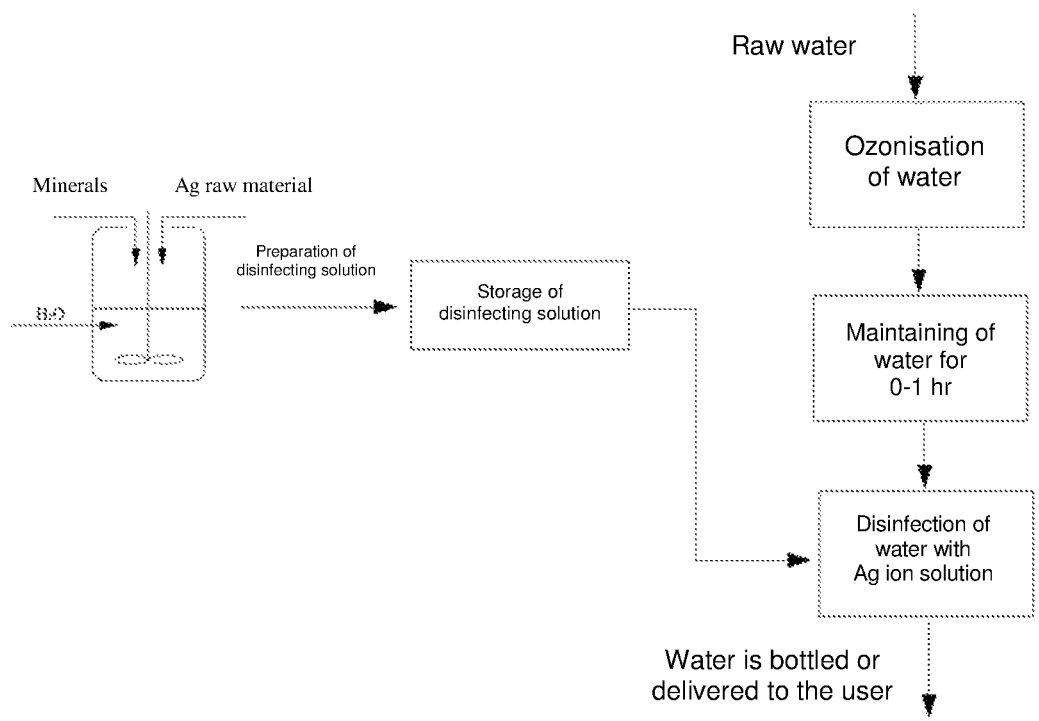

METHOD OF DISINFECTION OF DRINKING WATER USING OZONE AND SILVER CATIONS

FIELD OF THE INVENTION

The invention relates to disinfection, maintaining of microbiological safety and improvement of groundwater and surface water quality indicators.

DESCRIPTION OF RELATED ART

Drinking water is suitable for use only in the event that it does not contain microorganisms capable of posing a risk to human health. In some cases, drinking water can be kept in the open for three months or longer, so it is necessary to ensure that water is protected from microbial contamination over the entire storage period.

In order to eliminate the possibility of spreading of infectious diseases via water, water disinfection is carried out. Water disinfection methods are divided into four groups. The first group comprises physical disinfection methods, the second—thermal, the third—methods of disinfection by strong oxidizers, while the fourth—oligodynamic disinfection methods with metals. They can also be classified in a different way: reagent methods (disinfection by strong oxidizers and oligodynamic method) and non-reagent methods (physical and thermal disinfection methods).

Physical disinfection methods include water irradiation with electromagnetic radiation destroying microorganisms and treatment with ultrasound. Although the ultrasonic treatment method is effective, but in practice it is seldom used because it is complicated, in addition to that powerful ultrasonic generators are expensive. The disadvantage of the disinfection by germicidal ultraviolet irradiation is that there is no expeditious way to control effectiveness of the disinfection, in addition, this method is not suitable for disinfection of water of higher turbidity. Thermal disinfection method is heating or boiling of water, which is very expensive and is not used in water supply or drinking water packaging companies.

Strong oxidizers, such as chlorine and its compounds, iodine, ozone, potassium permanganate, etc. may be used for disinfection of water. Currently, drinking water supplied via water supply systems of residential areas is usually disinfected using chlorine compounds, bactericidal ultraviolet irradiation, ozone (A. Sakalauskas, V. Šulga, J. Jankauskas. Water Supply: Water Treatment: Educational Book. Vilnius Gediminas Technical University. Vilnius: Technika, 2007. UDK: 628.16 (075.8). ISBN 9789955281122). For disinfection of water in treatment plants, chlorine or its compounds containing the so-called active chlorine such as sodium hypochlorite, calcium hypochlorite, chlorine dioxide are used. In order to prolong the bactericidal effect of chlorine, chlorination of water along with amonisation is used, thus obtaining chloramines. During the hydrolysis of the latter, a strong oxidizing agent—hypochlorite ion is formed. Chloramines hydrolyse slowly. Therefore, initially their oxidative effect is lower than that of chlorine but their bactericidal efficiency is maintained for longer. An immense deficiency of water disinfection with chlorine is that the chlorine is very toxic, so during its transportation, storage and use fairly strict safety requirements for handling of chlorine must be observed. In addition, when chlorinating water containing organic impurities, halogenated derivatives having carcinogenic properties can be formed. Ozone—one of the strongest oxidizers destroying bacteria, spores and viruses is often used for disinfection of water. When water is treated with ozone, at the same time chromaticity of water can be reduced and unpleasant smell or taste eliminated. Ozone surplus that did not react with water impurities, in the water quickly turns into oxygen. In addition to nitrogen, other reactive oxygen derivatives with similar oxidizing ability, such as hydrogen peroxide, can also be used for disinfection of water. However, the disadvantage of this method of water disinfection with said reactive oxygen derivatives is that it does not provide a long-term disinfection effect and does not protect the drinking water stored in contact with ambient air from secondary microbial contamination.

Oligodynamic water disinfection method also includes disinfection using very low concentrations of metals (silver, copper, gold, etc.) or their compounds. Silver is the element with a high antimicrobial efficacy but at the same time, with low toxicity towards eukaryotic cells (Deepen, P., et al. Antimicrobial, Mechanical and Thermal Studies of Silver Particle-Loaded Polyurethane. Journal of Functional Biomaterials. 2013, 4, p. 358-375., Magalhaes, A. P. R., et al. Nanosilver Application in Dental Cements. ISRN Nanotechnology. 2012, 2012, p. 1-6. DOI:10.5402/2012/36543). Spectrum of antimicrobial effect of this element is quite wide, its virucidal effect is also important. It is known from the old times that silver ions released from silver products in small concentrations are harmless to human health. It was found that only 10% of ingested silver is absorbed in the intestine, and 90% is excreted from the body via the faeces (Guggenbichler, J. P., et al. A new technology of microdispersed silver in polyurethane induces antimicrobial activity in central venous catheters. Infection. 1999, 27 (1), p. S16-23). In addition, due to constantly renewable epithelial tissue, systemic spread of ingested silver in the body is unlikely. The World Health Organization reported that a content of silver consumed by people without any side effects (NOAEL) is equal 10 g per lifetime. The organization also points out that up to 0.1 mg/kg of silver in drinking water is tolerable and does not cause any risk to health. (World Health Organization. Guidelines for drinking-water quality [electronic resource]: incorporating 1st and 2nd addenda, Vol. 1, Recommendations. —3rd ed. Geneva: 2008. 434 p. ISBN 978 92 4 154761 1).

To ensure the long-term disinfection effect, it is useful to use oligodynamic disinfection methods, such as using silver in preparation of water together with water treatment using reactive oxygen derivatives (eg. ozone). Ozone, quickly fissionable to harmless compounds, and silver, in low concentrations but ensuring bactericidal effect, are not harmful to human health, and by combining these two reagent disinfection methods a cumulative or synergetic effect of disinfection can be achieved. Reactive oxygen derivatives would provide an effective instantaneous water disinfection effect, and silver would assure its long-term disinfection effect.

In addition to microbiological indicators of drinking water, chemical indicators are also important. Over time, consuming food products (including water) lacking of minerals necessary for the functioning of the human body, or when their ratio is unbalanced, electrolyte balance in the body can be damaged and may result in signs of illnesses. Moreover, the minerals can be quickly lost through heavy sweating or diarrhea. Drinking water with a balanced mineral content can help to maintain or restore the required amount of minerals in the body. Therefore, in addition to microbiological safety, in order to improve the quality of drinking water, the water can be enriched with minerals.

For the preparation of silver ion solutions, drinking water disinfection technologies use water-soluble silver compounds, such as silver nitrate, so the choice of raw materials is limited. Moreover, these solutions, in particular non-concentrated, are unstable, so for their stabilization substances undesirable in drinking water, such as organic compounds or acids, are often used. Besides, the disadvantage of disinfection with these solutions is that if there is a lack of substances binding silver ions into insoluble compounds and an overdose of disinfecting solution in disinfected water, the silver ions unreacted in the water can enter the body of water-consuming human and react with the biological molecules.

Patent No. RU2182124 specifies a combined method of water disinfection using an oxidation of water by ozone and silver ions. In the present invention, the silver ions and nano-particles are obtained by electrolysis in advance, consequently, an additional electrolysis equipment is required for the preparation of silver solution prior to its introduction to the water intended for disinfection.

The closest analog is described in Patent No. RU2182125. In mentioned patent is described a combined method of disinfection using ozone with a subsequent treatment of the water with a solution of silver salts (silver nitrate) and solution of copper salts (copper sulfate). The disadvantage of this invention is that only water-soluble compounds of two metals (copper and silver) shall be used for disinfection.

The present invention resolves the aforementioned problems and ensures water protection from secondary microbiological contamination for more than 3 months.

SUMMARY OF THE INVENTION

Microbiologically safe and healthy drinking water is prepared from raw water by clarifying and disinfecting it with the reactive oxygen derivatives and silver ion solution. Initially, the water is treated with ozone until the concentration of ozone in the water becomes 0.1-0.5 mg/L, and later, after 0-1 hours a required amount of disinfectant is added to the water in doses so the Ag concentration in drinking water would be 0.02-0.1 mg/L. Stable and safe silver disinfectant containing beneficial minerals obtained without the use of electrolysis equipment, strong mineral acids, organic or other undesirable water stabilizers is used for the preparation of drinking water, and for its preparation, various silver compounds or metallic silver can be used. The solution is stabilized with mineral substances positively complementing the overall intake of minerals.

By using such a solution together with the water disinfection by reactive oxygen derivatives, water kept in the open is additionally protected from secondary microbiological contamination for a long time, specifically, more than 3 months.

BRIEF DESCRIPTION OF THE DRAWINGS

Other features and advantages of the invention are described in the detailed descriptions of present invention with reference to the following drawing:

FIG. 1. Scheme for the preparation of safe and healthy drinking water.

DETAILED DESCRIPTION OF THE INVENTION

It should be understood that numerous specific details are set out in order to provide a complete and comprehensive description of the model embodiment of the invention. However, those skilled in the art will understand that the level of detail of the embodiment does not limit embodiments of the invention, which can be embodied without such specific instructions. Well-known methods, procedures and components have not been described in detail for the embodiment examples not to be misleading. In addition, this description shall not be considered as limiting the provided embodiment examples.

Safe and useful for the human body drinking water is prepared by means of clarifying and disinfecting raw water with reactive oxygen derivatives and disinfecting solution made on the base of stable silver ions, which supplements the water with useful minerals.

After the first step of raw water preparation, e.g. filtering, depending on the source, is ozonized so that the final concentration of ozone in it would be from 0.1 to 0.5 mg/L. After the ozonisation the water is maintained up to 60 minutes prior to the supply of silver ion solution to it in order to obtain a final concentration of silver from 0.02 to 0.1 mg/L in the prepared water.

The said disinfectant solution of silver ions is prepared by dissolving the required amount of at least one type of mineral substances in the water, which are salts selected from the group consisting of: sodium chloride, potassium chloride, magnesium chloride, calcium chloride, sodium iodide, potassium iodide. A required amount of water-soluble or water-insoluble silver compounds or metallic silver is dissolved in this solution by stirring it intensively. Thermal energy can be used to accelerate the dissolution. Such solution consisting of silver ions (2-3500 ppm), alkaline and/or alkaline-earth metal salts and water is stable and does not lose clarity when stored exposed to the sunlight longer than 2 years.

Drinking water always contains a certain number of compounds binding silver ions into insoluble compounds. However, if during the disinfection an excessive amount of silver ions gets into the water, the number of compounds naturally present in the water is insufficient to bind all the silver ions into the insoluble compounds. Said mineral substances, in case of the overdose of the disinfectant solution in the disinfected water, convert the excess silver ions into insoluble compounds, and the reactivity of the latter compounds with the human biological molecules is lower than that of soluble silver compounds.

During the disinfection process, insoluble particles of silver compounds or silver of smaller dimensions, as compared to particles formed using an electrolytic equipment or when disinfecting water with a solution of a water-soluble silver salts (silver nitrate), form in the water. Surface area ratio to mass of particles of smaller dimensions is greater, therefore, the greater part of silver atoms or ions have a direct contact with the environment and can participate in the reactions.

When using drinking water disinfection method, it is possible to prepare water positively supplementing the body with mineral substances, wherein the weight ratio of sodium and potassium ions in the water after the treatment of the water with a stable solution of silver, alkaline earth and/or alkali metal cations becomes $0.2<Na^+/K^+<1$, where $Na^+<100$ mg. Such disinfecting solution is safer than conventional disinfecting solutions containing silver ions.

Description of the Preferred Embodiments

The examples illustrate the present invention, and do not limit the scope of the invention.

EXAMPLE 1

Deep well water filtered and treated with ozone: ozone concentration in the water was 0.3 mg/L. The basic composition of the raw water before ozonization is presented in Table 1. After treatment with ozone, a required amount of silver ions disinfectant was supplied into the water by a dosage pump so that the concentration of silver in the water would reach 0.02 mg/L or 0.045 mg/L. The composition of prepared drinking water is provided in Table 2. Drinking water was bottled into 19-liter drinking water bottles and stored in these open containers, monitoring the dynamic changes in the microbiological indicators of water specified in Table 5. Microbial contamination in the prepared drinking water was not observed during the 3 months of the test. Meanwhile in ozonized water but untreated with the disinfectant microbiological contamination was found after just 6-9 days (>1000 KSV/ml).

EXAMPLE 2

Deep well water filtered and treated with ozone: ozone concentration in the water was 0.3 mg/L. The basic composition of the raw water before ozonization is presented in Table 1. After treatment with ozone, after 6 minutes, a required amount of silver ions disinfectant was supplied into the water by a dosage pump so that the concentration of silver in the water would reach 0.02 mg/L and the mass ratio of sodium and potassium ions would be $0.2<Na^+/K^+<1$. The composition of prepared drinking water is provided in Table 3. Drinking water was bottled into 19-liter drinking water bottles and stored in these open containers, monitoring the dynamic changes in the microbiological indicators of water specified in Table 5. Microbial contamination in the prepared drinking water was not recorded during the 3 months of the test. Meanwhile, in the water, which was ozonized but untreated with the disinfectant, microbiological contamination was found after just 6-9 days (>1000 KSV/ml).

EXAMPLE 3

Deep well water filtered and treated with ozone: ozone concentration in the water was 0.3 mg/L. The basic composition of the raw water before ozonization is presented in Table 1. After treatment with ozone, after 6 minutes, a required amount of silver ions disinfectant was supplied into the water by a dosage pump so that the concentration of silver in the water would reach 0.02 mg/L, the mass ratio of sodium and potassium ions would be $0.2<Na^+/K^+<1$, whereas concentrations of magnesium and calcium would reach $K^+=Mg^{2+}=Ca^{2+}=50$ mg/L. The composition of prepared drinking water is provided in Table 4. Drinking water was bottled into 19-liter drinking water bottles and stored in these open containers, monitoring the dynamic changes in the microbiological indicators of water contained in Table 5. Microbial contamination in prepared drinking water was not observed during the 3 months of the test. Meanwhile in the water, which was ozonized but untreated with the disinfectant, microbiological contamination was found after just 6-9 days (>1000 KSV/ml).

TABLE 1

The basic composition of the raw water before treatment with ozone

| Ions | Amount, mg/L |
|---|---|
| Sodium | 11 |
| Potassium | 8 |
| Calcium | 26 |
| Magnesium | 14 |
| Chlorides | 111 |

TABLE 2

The basic composition of the drinking water prepared according to Example 1

| Ions | Amount, mg/L |
|---|---|
| Sodium | 15 |
| Potassium | 8 |
| Calcium | 26 |
| Magnesium | 14 |
| Chlorides | 117 |
| Silver | 0.02 or 0.045 |

TABLE 3

The basic composition of the drinking water prepared according to Example 2

| Ions | Amount, mg/L |
|---|---|
| Sodium | 11 |
| Potassium | 30 |
| Calcium | 26 |
| Magnesium | 14 |
| Chlorides | 131 |
| Silver | 0.02 |

TABLE 4

The basic composition of the drinking water prepared according to Example 3

| Ions | Amount, mg/L |
|---|---|
| Sodium | 11 |
| Potassium | 50 |
| Calcium | 50 |
| Magnesium | 50 |
| Chlorides | 297 |
| Silver | 0.02 |

TABLE 5

The dynamics of microbiological indicators of drinking water

The number of colony-forming units, KSV/ml

| Duration from the start of the experiment, days | Example 1 | | | | Example 2 | | Example 3 | | Ozonized water | |
|---|---|---|---|---|---|---|---|---|---|---|
| | Ozonized water + Disinfectant solution (Ag = 0.045 mg/kg) | | Ozonized water + Disinfectant solution (Ag = 0.02 mg/kg) | | Ozonized water + Disinfectant solution (Ag = 0.02 mg/kg) | | Ozonized water + Disinfectant solution (Ag = 0.02 mg/kg) | | | |
| | 22° C. | 37° C. | 22° C. | 37° C. | 22° C. | 37° C. | 22° C. | 37° C. | 22° C. | 37° C. |
| 0 | ≤1 | ≤1 | ≤1 | ≤1 | ≤1 | ≤1 | ≤1 | ≤1 | ≤1 | ≤1 |
| 2 | ≤1 | ≤1 | ≤1 | ≤1 | ≤1 | ≤1 | ≤1 | ≤1 | ≤1 | ≤1 |
| 6 | ≤1 | ≤1 | ≤1 | ≤1 | ≤1 | ≤1 | ≤1 | ≤1 | 60 | 20 |
| 9 | ≤1 | ≤1 | ≤1 | ≤1 | ≤1 | ≤1 | ≤1 | ≤1 | 1500 | 1460 |
| 16 | ≤1 | ≤1 | ≤1 | ≤1 | ≤1 | ≤1 | ≤1 | ≤1 | 1590 | 1450 |
| 23 | ≤1 | ≤1 | ≤1 | ≤1 | ≤1 | ≤1 | ≤1 | ≤1 | — | — |
| 34 | ≤1 | ≤1 | ≤1 | ≤1 | ≤1 | ≤1 | ≤1 | ≤1 | — | — |
| 48 | ≤1 | ≤1 | ≤1 | ≤1 | ≤1 | ≤1 | ≤1 | ≤1 | — | — |
| 90 | ≤1 | ≤1 | ≤1 | ≤1 | ≤1 | ≤1 | ≤1 | ≤1 | — | — |

Although numerous characteristics and advantages of the invention have been listed in the description together with structural details and features of the invention, the description is provided as a model embodiment of the invention. There may be changes in the details, especially in the form, size and layout of substances without departing from the principles of the invention, and in accordance with the most widely comprehensible meanings of concepts used in the items of the claim.

The invention claimed is:

1. A method of disinfecting drinking water comprising ozonizing the drinking water and treatment of the drinking water with silver ions, wherein said method comprises:
   a) ozonizing the drinking water until the concentration of ozone in the drinking water becomes 0.1-0.5 mg/L,
   b) maintaining said ozonized drinking water for up to 60 minutes and treating the ozonized drinking water with a stable solution consisting essentially of dissolved silver ions and at least one of, alkaline earth and alkaline metal salts, by supplying such amount of said stable solution to the said ozonized drinking water, so that the silver ion concentration in drinking water would be from 0.02 to 0.1 mg/L;
   wherein the solution is prepared by dissolving metallic silver in the presence of a high concentration of at least one of alkaline earth or alkaline metal salts;
   wherein the silver cations are derived not by way of electrolysis prior to water treatment and wherein the at least one of, alkaline earth and alkaline metal salts of the stable solution is configured to convert silver ions into insoluble compounds in the ozonized drinking water.

2. The method according to claim 1, wherein said at least one of, alkaline earth and alkaline metal salts are selected from the group consisting of sodium chloride, potassium chloride, magnesium chloride, calcium chloride, sodium iodide and potassium iodide.

3. The method according to claim 1, wherein said solution is stable and no precipitate is formed even when stored exposed to sunlight for more than 2 years.

4. The method according to claim 1, wherein the mass ratio of sodium and potassium ions in the ozonized water after treatment of the water with the stable solution becomes $0.2 < Na^+/K^+ < 1$, where $Na^+ < 100$ mg.

5. The method according to claim 1, wherein the drinking water kept in the open is protected from secondary microbiological contamination more than 3 months.

6. The method according to claim 2, wherein said solution is stable and no precipitate is formed when stored exposed to sunlight for more than 2 years.

7. The method according to claim 2, wherein the drinking water kept in the open is protected from secondary microbiological contamination for more than 3 months.

8. The method according to claim 3, wherein the drinking water kept in the open is protected from secondary microbiological contamination for more than 3 months.

9. The method according to claim 4, wherein the drinking water kept in the open is protected from secondary microbiological contamination for more than 3 months.

10. The method according to claim 6, wherein the drinking water kept in the open is protected from secondary microbiological contamination for more than 3 months.

* * * * *